(12) United States Patent
Ulrey et al.

(10) Patent No.: US 10,436,142 B2
(45) Date of Patent: Oct. 8, 2019

(54) SYSTEMS AND METHODS FOR DETERMINING FUEL RELEASE FROM A FUEL INJECTOR

(71) Applicant: Ford Global Technologies, LLC, Dearborn, MI (US)

(72) Inventors: Joseph Ulrey, St. Joseph, MI (US); Michael Uhrich, Wixom, MI (US); Ross Pursifull, Dearborn, MI (US); Steven Schwochert, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/419,919

(22) Filed: May 22, 2019

(65) Prior Publication Data

US 2019/0271279 A1 Sep. 5, 2019

Related U.S. Application Data

(62) Division of application No. 15/873,390, filed on Jan. 17, 2018, now Pat. No. 10,337,443.

(51) Int. Cl.
| | |
|---|---|
| *F02D 41/00* | (2006.01) |
| *F02D 41/30* | (2006.01) |
| *F02D 41/22* | (2006.01) |
| *F02D 33/00* | (2006.01) |
| *F02D 35/00* | (2006.01) |

(52) U.S. Cl.
CPC ....... *F02D 41/3076* (2013.01); *F02D 33/006* (2013.01); *F02D 35/0015* (2013.01); *F02D 41/0087* (2013.01); *F02D 41/221* (2013.01); *F02D 2041/224* (2013.01); *F02D 2200/0802* (2013.01)

(58) Field of Classification Search
CPC .... F02D 19/081; F02D 41/0025; F02D 41/22; F02D 41/221; F02D 41/222; F02D 19/025; F02D 19/0623
USPC ......... 123/434, 690; 701/101, 107, 112, 114
See application file for complete search history.

(56) References Cited

U.S. PATENT DOCUMENTS

| | | | | |
|---|---|---|---|---|
| 2003/0131587 A1* | 7/2003 | Kawamura | ............. | F01N 11/00 60/276 |
| 2015/0300287 A1* | 10/2015 | Ulrey | .................... | F02D 41/221 701/103 |
| 2016/0245221 A1* | 8/2016 | McEwan | ................. | F02D 41/38 |
| 2017/0002761 A1* | 1/2017 | Dudar | ..................... | F02D 41/22 |
| 2017/0067407 A1* | 3/2017 | Dudar | ..................... | F02D 17/04 |
| 2017/0241425 A1* | 8/2017 | Frampton | ............... | F04D 25/16 |

* cited by examiner

*Primary Examiner* — John Kwon
(74) *Attorney, Agent, or Firm* — Geoffrey Brumbaugh McCoy Russell LLP (57) ABSTRACT

Methods and systems for evaluating whether or not a fuel amount that is greater than a threshold has been release to an engine via fuel injectors when the fuel injectors are commanded off are presented. In one example, an oxygen sensor is activated and engine cranking is prevented until a pumping current of the oxygen sensor is proportionate to a concentration of oxygen sensed via the oxygen sensor so that released fuel may be observed during engine starting.

8 Claims, 6 Drawing Sheets

FIG. 5

SYSTEMS AND METHODS FOR DETERMINING FUEL RELEASE FROM A FUEL INJECTOR

CROSS REFERENCE TO RELATED APPLICATION

The present application is a divisional of U.S. Non-Provisional patent application Ser. No. 15/873,390, entitled "SYSTEMS AND METHODS FOR DETERMINING FUEL RELEASE FROM A FUEL INJECTOR," and filed on Jan. 17, 2018. The entire contents of the above-referenced application are hereby incorporated by reference for all purposes.

FIELD

The present description relates generally to methods and systems for diagnosing the presence or absence of fuel release from a fuel injector of an internal combustion engine.

BACKGROUND/SUMMARY

An internal combustion engine may emit hydrocarbons, carbon monoxide, and oxides of nitrogen during the course of operation. These emissions may be treated via an after treatment system so that they may be converted to carbon dioxide and water. However, the after treatment system may have to reach an elevated temperature before it begins to convert a high percentage of the engine emissions. If the engine is operated with stoichiometric or lean combustion before the after treatment system reaches operating temperature, tailpipe emissions of hydrocarbons and carbon monoxide may be reduced as compared to if the engine is operated rich. Therefore, an engine may be started and operated with a lean or stoichiometric air-fuel mixture before the after treatment system reaches operating temperature. Nevertheless, it may be difficult at times to get the engine to operate with a stoichiometric or slightly lean air-fuel ratio during engine starting.

The inventors herein have recognized that one potential reason for the engine to not operate with a stoichiometric or lean air-fuel ratio during engine starting and run-up is that small amounts of fuel may be released into engine cylinders or the engine's intake manifold without the fuel injectors being commanded open. The amount of fuel released may be a function of fuel pressure, characteristics of an individual fuel injector, the amount of time the fuel injector is closed and exposed to pressurized fuel, as well as other factors. If fuel is released from a fuel injector while the fuel injector is not being commanded open while an engine is stopped, the released fuel may increase engine hydrocarbon emissions and cause the vehicle to exceed desired emissions levels.

In one example, the issues described above may be addressed by an engine operating method, comprising: identifying a fuel injector of an engine that releases fuel while the fuel injector is commanded off via a controller and a fuel-air ratio indicated from an oxygen sensor during engine cranking and run-up; and adjusting an actuator via the controller based on the fuel injector.

By monitoring output of an oxygen sensor that has reached operating temperature prior to engine cranking and run-up, it may be possible to sense an engine fuel-air ratio so that the technical result of determining the presence or absence of fuel being released from a fuel injector that has not been commanded open may be provided (i.e. injector leak during engine-stopped). In particular, a larger fuel-air ratio during engine starting may indicate that fuel has been released to the engine cylinders after an engine has been stopped. The particular cylinder into which fuel was released via a fuel injector may be determined via starting the engine with a deactivated cylinder and reassessing the engine fuel-air ratio. If the engine fuel air-ratio remains large, a different cylinder may be deactivated for the next engine start and the cylinder that was previously deactivated may be activated during the next start. The process may be repeated until either all cylinders of a cylinder bank have been deactivated once during starting or until the engine fuel-air ratio is reduced. If the engine fuel-air ratio is reduced, the cylinder that was deactivated during the engine start may be identified as the cylinder having a degraded fuel injector.

The present description may provide several advantages. For example, the approach may reduce engine emissions via determining the presence or absence of fuel that may have been released to engine cylinders. Further, the approach may allow for specific cylinder identification so that time to maintain the engine may be reduced. Additionally, the approach may reduce engine fuel consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
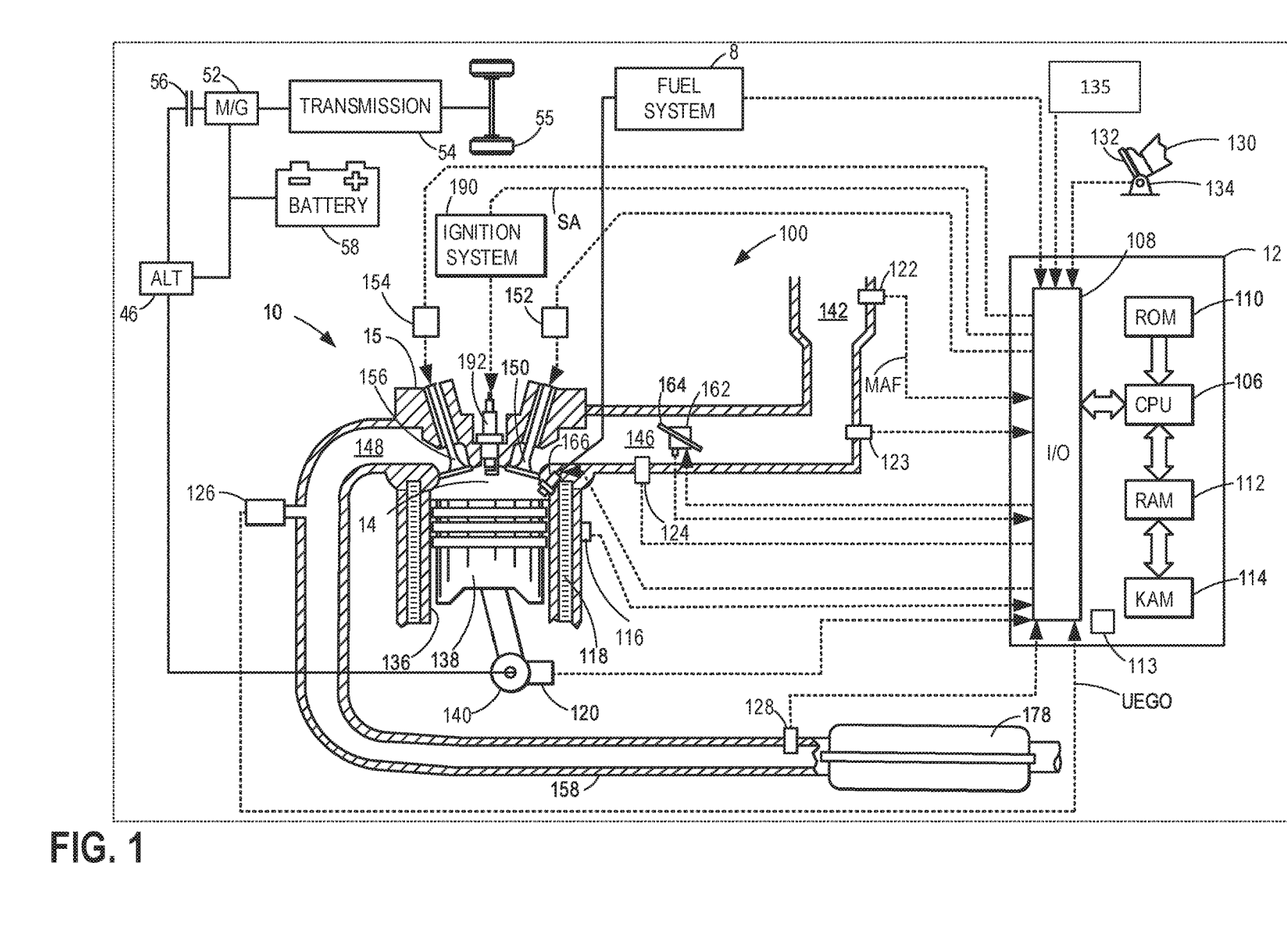
FIG. 1 shows a schematic depiction of an engine system of a vehicle.
Figure 2A:
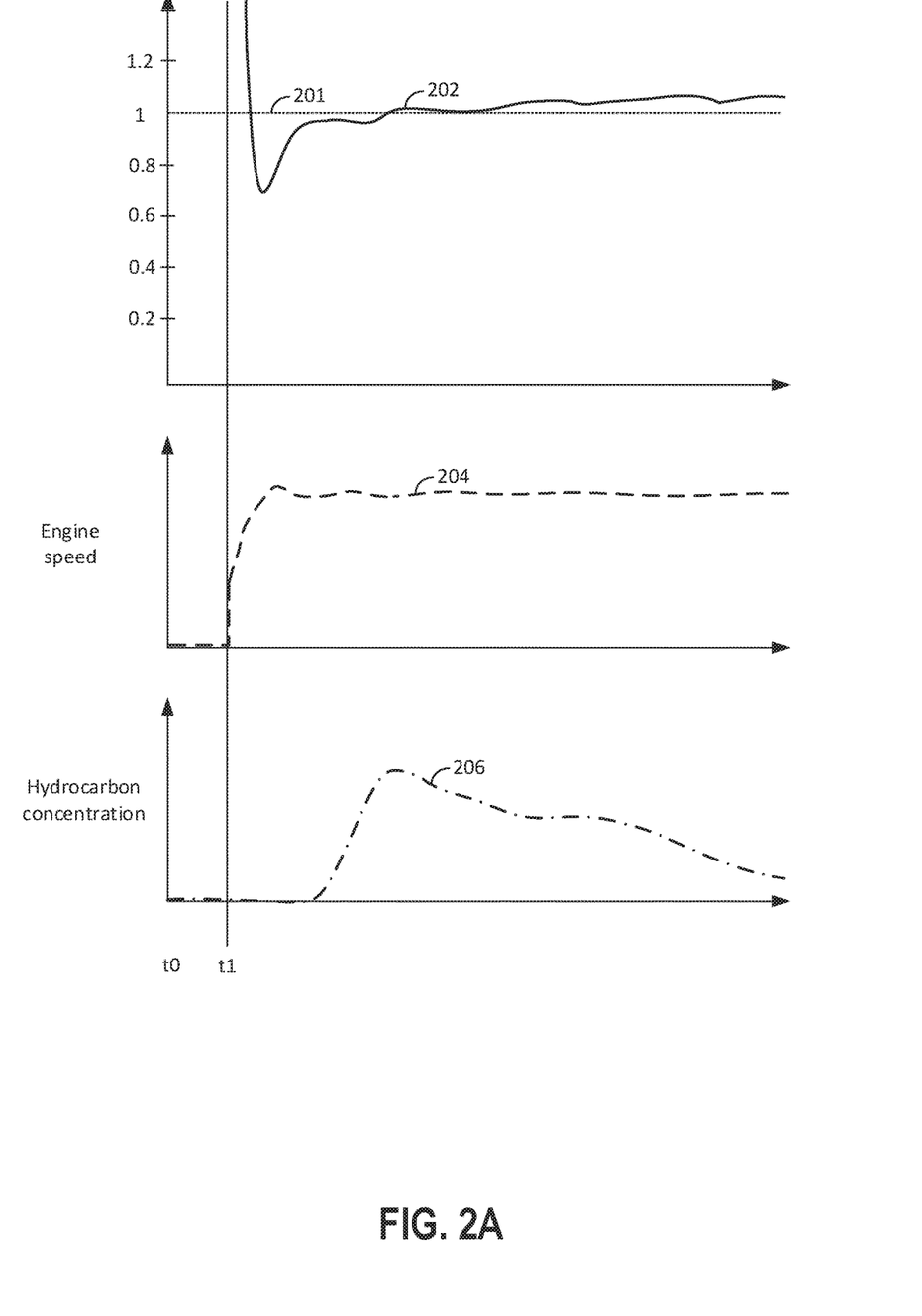
FIGS. 2A and 2B show signals of interest during an example engine start.
Figure 2B:
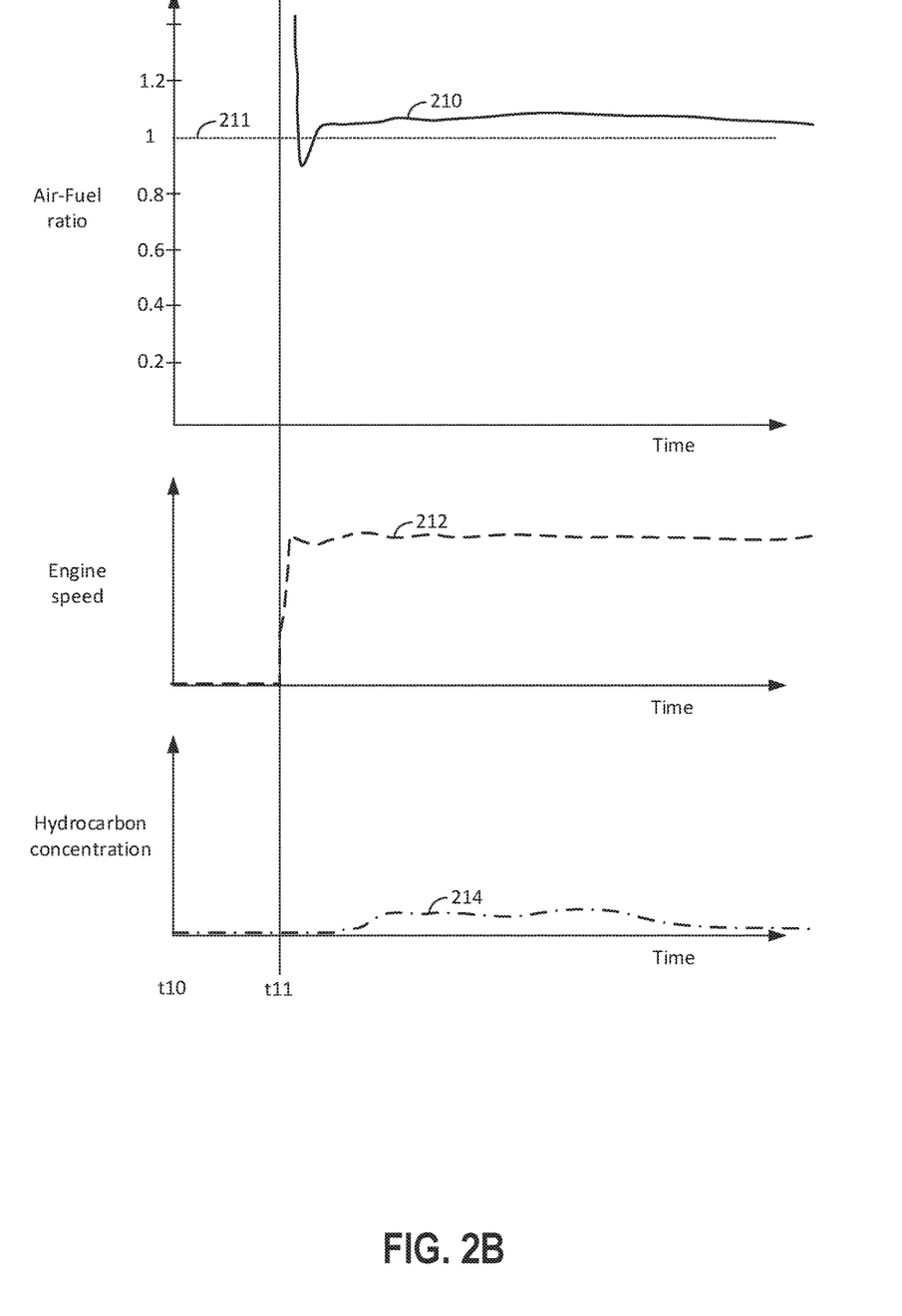
Figure 3:
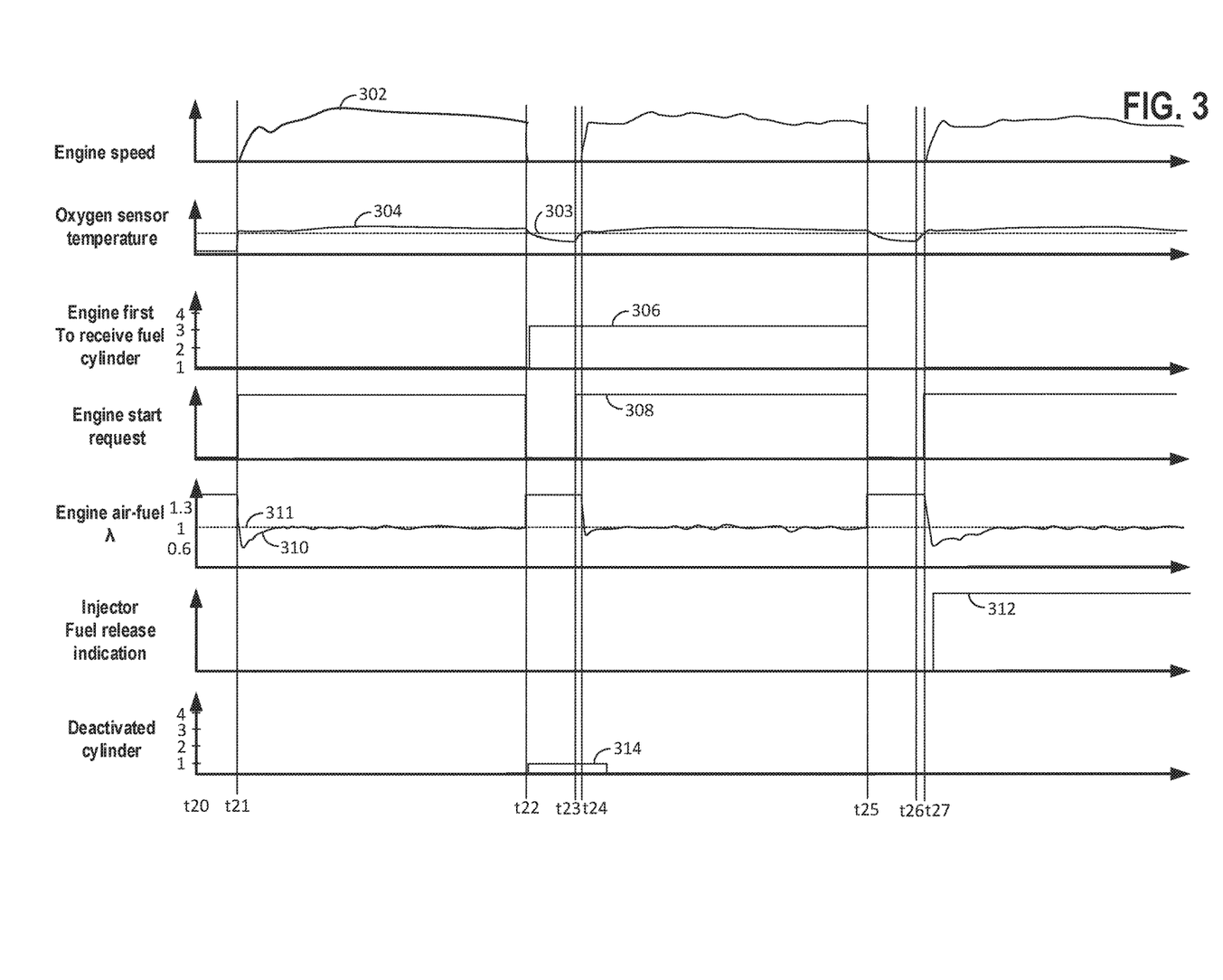
FIG. 3 shows an example engine operating sequence according to the method of FIGS. 4 and 5.
Figure 4:
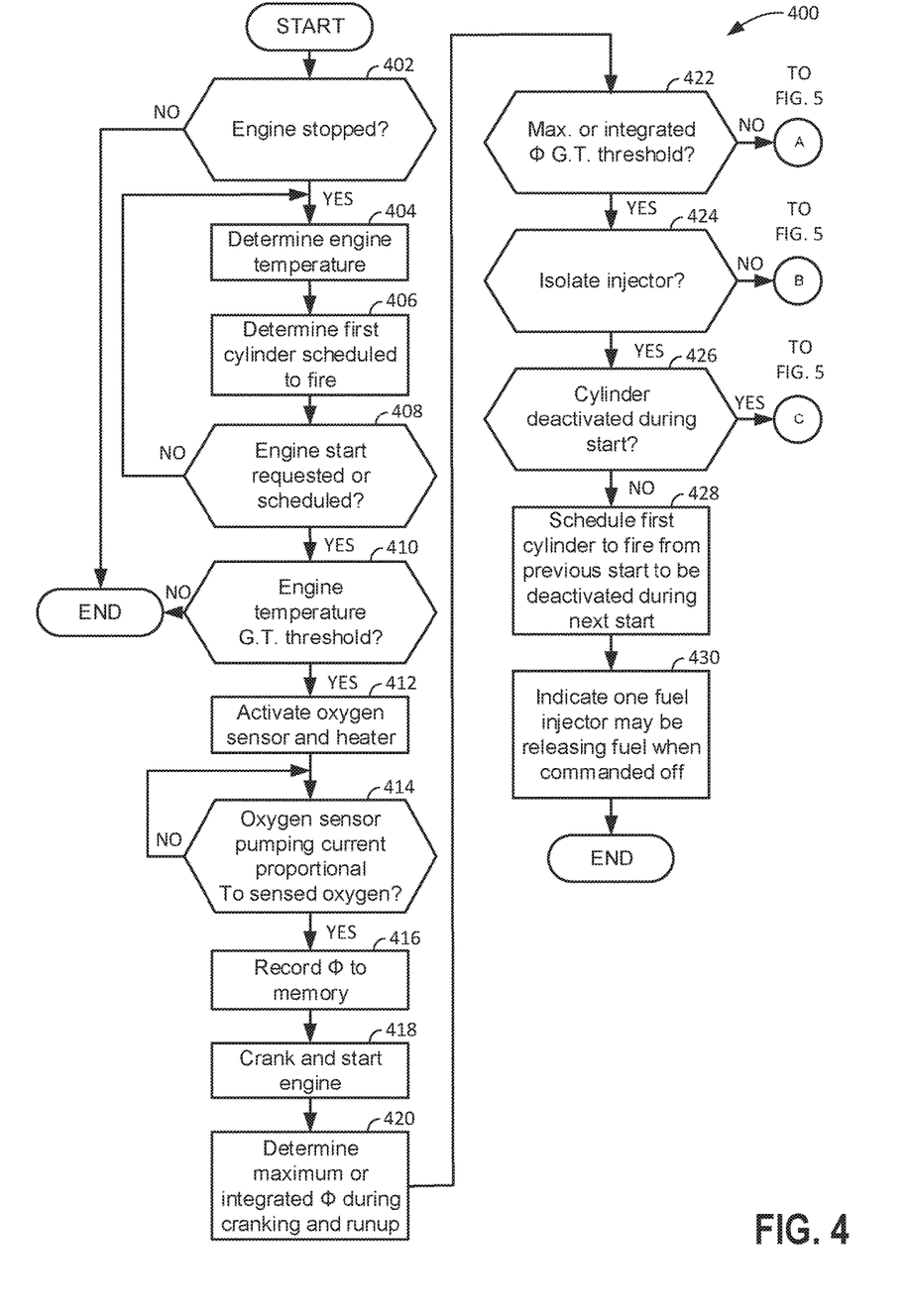
FIGS. 4 and 5 illustrate an example method for operating an engine and determining the presence or absence of fuel being released from fuel injectors.
Figure 5:
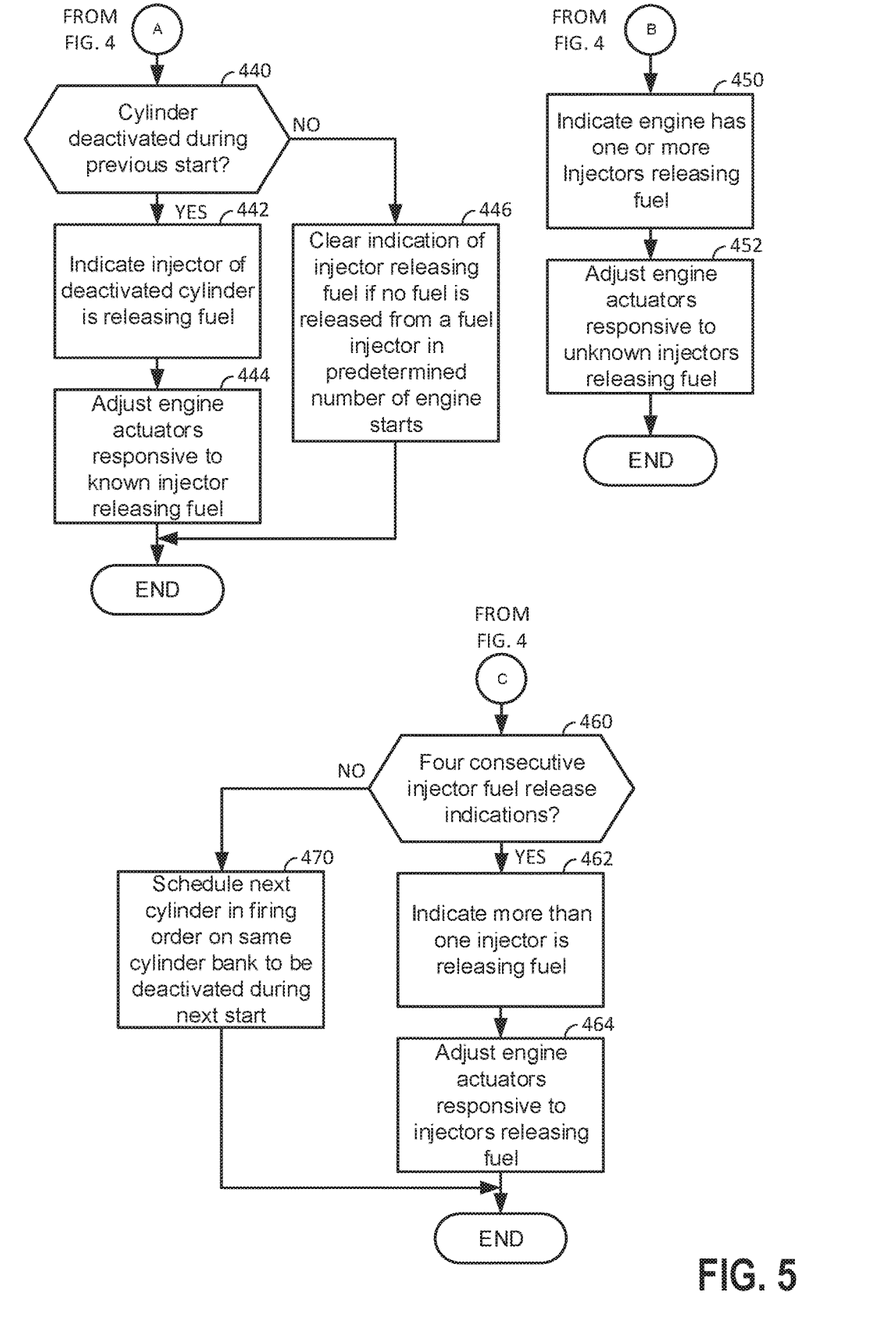

The following description relates to systems and methods for detecting the presence or absence of fuel that may have been released from one or more fuel injectors of an engine. As shown in FIG. 1, an engine system may include an exhaust gas oxygen sensor upstream of an emission control device. The upstream exhaust gas oxygen sensor may be a UEGO sensor, such as the example UEGO sensor configured to measure an amount of oxygen in the exhaust gas. The engine's fuel-air ratio may be determined from the oxygen sensor and its output during engine cranking and run-up (e.g., engine acceleration from cranking speed to idle speed) may be indicative of fuel being released to an engine as shown in FIG. 2A. If fuel has not been released to the engine while the engine is stopped (e.g., not rotating), the engine's fuel-air ratio during engine cranking and run-up may be as shown in FIG. 2B. Because the oxygen sensor may be located in an exhaust manifold that is in communication with a plurality of engine cylinders, it may be difficult to determine which if any fuel injector released fuel to the engine when the fuel injector was commanded off. By deactivating an engine cylinder and operating the engine as shown in FIG. 3, it may be possible to isolate the engine cylinder that may include the fuel injector that is releasing the fuel. A method for determining the presence or absence of fuel released to engine cylinders is shown in FIGS. 4 and 5.

FIG. 1 depicts an example of a cylinder 14 of an internal combustion engine 10, which may be included in an engine system 100 in a vehicle 5. Engine 10 may be controlled at least partially by a control system, including a controller 12, and by input from a vehicle human operator 130 via an input device 132. In this example, input device 132 includes an accelerator pedal and a pedal position sensor 134 for generating a proportional pedal position signal. Alternatively, controller 12 may receive input from autonomous driver 135. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of the vehicle via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown in FIG. 1, vehicle 5 includes engine 10 and an electric machine 52. Electrification allows flexibility in engine starting including starting on less than all cylinders that allows the subject diagnostic. Electric machine 52 may be a motor or a motor/generator. Crankshaft 140 of engine 10 and electric machine 52 are connected via transmission 54 to vehicle wheels 55 when clutch 56 is engaged. In the depicted example, a clutch 56 is provided between crankshaft 140 and electric machine 52, and electric machine 52 is coupled to transmission 54. Controller 12 may send a signal to an actuator of clutch 56 to engage or disengage the clutch, so as to connect or disconnect crankshaft 140 from electric machine 52 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via an intake passage 142 and an intake manifold 146. Intake manifold 146 can communicate with other cylinders of engine 10 in addition to cylinder 14. In some examples, intake passage 142 may include one or more boosting devices, such as a turbocharger or a supercharger, coupled therein when the engine system is a boosted engine system. A throttle 162 including a throttle plate 164 may be provided in the intake passage for varying the flow rate and/or pressure of intake air provided to the engine cylinders. An exhaust manifold 148 can receive exhaust gases from cylinder 14 as well as other cylinders of engine 10.

Each cylinder of engine 10 may include one or more intake valves and one or more exhaust valves. For example, cylinder 14 is shown including at least one intake poppet valve 150 and at least one exhaust poppet valve 156 located in cylinder head 15. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. A timing of signal may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

An exhaust gas sensor 126 is shown coupled to exhaust manifold 148 upstream of an emission control device 178, coupled within an exhaust passage 158. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor configured to provide an output, such as a voltage signal, that is proportional to an amount of oxygen present in the exhaust gas. Emission control device 178 may be a three-way catalyst, a NOx trap, various other emission control devices, or combinations thereof. In the example of FIG. 1, emission control device 178 is a three-way catalyst configured to reduce NOx and oxidize CO and unburnt hydrocarbons.

The output current of UEGO sensor 126 may be used to adjust engine operation. For example, the amount of fuel delivered to cylinder 14 may be varied using a feed-forward (e.g., based on desired engine torque, engine airflow, etc.) and/or feedback (e.g., using oxygen sensor output) approach. In this way, controller 12 may accurately control the AFR of engine 10 based on feedback from UEGO sensor 126 and adaptively learn fuel injector and/or air metering errors, which can then be compensated for by adjusting the fuel command until the actual AFR reaches the desired AFR. For example, if UEGO sensor 126 measures a rich fuel condition, an amount of fuel delivered will be reduced (e.g., by reducing a pulse-with of signal provided via controller 12). Conversely, if UEGO sensor 126 measures a lean fuel condition, the amount of fuel delivered will be increased (e.g., by increasing a pulse-width of signal provided via controller 12). However, the closed-loop fuel control of control architecture 200 may not be utilized before UEGO sensor 126 reaches its light-off temperature, as oxygen measurements taken prior to UEGO sensor 126 reaching its light-off temperature may not be accurate. For example, UEGO sensor 126 may not have reached its light-off temperature during an engine cold start, as further described below.

Returning to FIG. 1, controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an ambient temperature from a temperature sensor 123 coupled to intake passage 142; an exhaust gas temperature from a temperature sensor 128 coupled to exhaust passage 158; a profile ignition pickup signal from a Hall effect sensor 120 (or other type) coupled to crankshaft 140; throttle position from the throttle position sensor; signal UEGO from exhaust gas sensor 126, which may be used by controller 12 to determine the AFR of the exhaust gas; and an absolute manifold pressure signal from a MAP sensor 124. An engine speed signal, RPM, may be generated by controller 12 from position sensor 120. The manifold pressure signal MAP from MAP sensor 124 may be used to provide an indication of vacuum or pressure in the intake manifold. Controller 12 may infer an engine temperature based on the engine coolant temperature. Further, controller 12 is shown having a current sensor 113, which may be used to detect a current output by a sensor, such as UEGO sensor 126, as further described below. Additional sensors, such as various temperature, pressure, and humidity sensors, may be coupled throughout vehicle 5.

Controller 12 receives signals from the various sensors of FIG. 1 and employs the various actuators of FIG. 1 to adjust engine operation based on the received signals and instructions stored on a memory of the controller. For example, the controller may determine an amount of power (and a corresponding voltage) to supply to a heater of UEGO sensor 126 to quickly raise UEGO sensor 126 to its operating temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The system of FIG. 1 provides for a system, comprising: an engine including at least one fuel injector and an oxygen sensor positioned in an exhaust manifold; a controller storing executable instructions in non-transitory memory that, when executed, cause the controller to: adjust an engine starting procedure after identifying that the at least one fuel injector released greater than a threshold amount of fuel into the engine while the engine was stopped and while the at least one fuel injector was commanded off, the identification performed during cranking and run-up of the engine during an engine start. The system further comprises additional instructions to determine a maximum fuel-air ratio during the cranking and run-up. The system includes where the identification is based on the maximum fuel-air ratio exceeding a threshold. The system includes where adjusting the engine starting procedure includes deactivating an engine cylinder.

Referring now to FIG. 2A, an example engine starting sequence is shown. FIG. 2A shows three plots and the three plots are aligned in time. Vertical lines at time t0-t1 represent times of interest in the sequence. Controller 12 may include non-transitory executable instructions to operate the engine at the conditions shown and discussed in the description of FIG. 2A.

The first plot from the top of FIG. 2A is a plot of engine lambda ($\lambda$) (e.g., actual air-fuel ratio divided by the stoichiometric air-fuel ratio) versus time. The vertical axis represents engine lambda and the horizontal axis represents time. Time increases from the right side of the figure to the left side of the figure. Solid line 202 represents the engine lambda value. Horizontal line 201 represents a stoichiometric air-fuel ratio.

The second plot from the top of FIG. 2A is a plot of engine speed versus time. The vertical axis represents engine speed and engine speed increases in the direction of the vertical axis arrow. The horizontal axis represents time and time increases from the right side of the figure to the left side of the figure. Dashed line 204 represents the engine speed value.

The third plot from the top of FIG. 2A is a plot of concentration of hydrocarbons emitted from the engine versus time. The vertical axis represents concentration of hydrocarbons emitted from the engine and concentration of hydrocarbons emitted from the engine increases in the direction of the vertical axis arrow. The horizontal axis represents time and time increases from the right side of the figure to the left side of the figure. Dash-dot line 206 represents the concentration of hydrocarbons emitted from the engine.

In this example, one or more fuel injectors have released fuel into one or more engine cylinders before the engine begins to be cranked (e.g., rotated under power of a starter before torque from combustion is sufficient to rotate the engine at or above cranking speed (250 RPM)). The fuel that is released into engine cylinders is not factored into the amount of fuel injected to the engine during the engine start. The amount of fuel injected to the engine is based on engine temperature, barometric pressure, and the number of fuel injections since the engine was last stopped. For example, the amount of fuel injected may be reduced as engine temperature increases. Further, the amount of fuel injected to the engine may decrease as the number of fuel injections since the last engine stop increases, which may compensate for fuel that may enter the engine crankcase after the fuel is injected. The amount of fuel injected may be decreased with decreasing barometric pressure to compensate for the lower air amount in engine cylinders during engine cranking. The engine is stopped at time t0 and it has been stopped for more than a threshold amount of time (e.g., 25 minutes) so that pressure in the fuel system may act to release fuel from one or more fuel injectors when the fuel injectors are commanded off (e.g., no voltage is applied to the fuel injectors).

Shortly before time t1, the engine is cranked and then combustion within the engine accelerates the engine toward idle speed at time t1. The engine lambda value begins at a high level and it decreases quickly as exhaust gas exits engine cylinders. The engine lambda value decreases to a minimum value of about 0.7 and then it begins to slowly increase. The engine lambda value of 0.7, for example, corresponds to more than a threshold amount of fuel being released from fuel injectors during the engine stop period. The engine lambda value of 0.7 corresponds to an engine $\Phi$ (e.g., fuel-air ratio divided by the stoichiometric fuel-air ratio) value of 1.43 (e.g., maximum $\Phi$ of 1.43). A maximum engine $\Phi$ value greater than 1.3, for example, during engine cranking and run-up may correspond to more than a threshold amount of fuel being released from the fuel injectors during the engine stop period. A maximum engine $\Phi$ value less than 1.3, for example, during engine cranking and run-up may correspond to less than a threshold amount of fuel being released from the fuel injectors during the engine stop period. The rich mixture exiting the engine due to release of fuel to engine cylinders while the engine was stopped results in a higher concentration of hydrocarbons being emitted from the engine.

Thus, by monitoring the engine Φ during engine cranking, run-up, and a few seconds after the engine reaches idle speed, a determination as to whether or not more than a threshold amount of fuel has been released to the engine via fuel injectors during a period when the engine is not rotating and the fuel injectors are commanded off may be made. For example, if an engine Φ greater than a threshold amount (e.g., 1.3) has been observed during a period between engine cranking and a few seconds after the engine reaches idle speed, it may be determined that more than a threshold amount of fuel has been released to engine cylinders during an engine stop period when the fuel injectors have been commanded off.

In addition, if one of the first fueled and ignited cylinders misfires, it may also be an indication of an injector releasing fuel when an engine is stopped. The misfire may be indicated via a deceleration of crankshaft speed.

Referring now to FIG. 2B, an example engine starting sequence is shown. FIG. 2B shows three plots and the three plots are aligned in time. Vertical lines at time t10-t11 represent times of interest in the sequence. Controller 12 may include non-transitory executable instructions to operate the engine at the conditions shown and discussed in the description of FIG. 2B.

The first plot from the top of FIG. 2B is a plot of engine lambda (λ) (e.g., actual air-fuel ratio divided by the stoichiometric air-fuel ratio) versus time. The vertical axis represents engine lambda and the horizontal axis represents time. Time increases from the right side of the figure to the left side of the figure. Solid line 210 represents the engine lambda value. Horizontal line 211 represents a stoichiometric air-fuel ratio.

The second plot from the top of FIG. 2B is a plot of engine speed versus time. The vertical axis represents engine speed and engine speed increases in the direction of the vertical axis arrow. The horizontal axis represents time and time increases from the right side of the figure to the left side of the figure. Dashed line 212 represents the engine speed value.

The third plot from the top of FIG. 2B is a plot of concentration of hydrocarbons emitted from the engine versus time. The vertical axis represents concentration of hydrocarbons emitted from the engine and concentration of hydrocarbons emitted from the engine increases in the direction of the vertical axis arrow. The horizontal axis represents time and time increases from the right side of the figure to the left side of the figure. Dash-dot line 214 represents the concentration of hydrocarbons emitted from the engine.

In this example, one or more fuel injectors have not released more than a threshold amount of fuel into one or more engine cylinders before the engine begins to be cranked (e.g., rotated under power of a starter before torque from combustion is sufficient to rotate the engine at or above cranking speed (250 RPM)). However, a hybrid vehicle may rotate the engine via the electric machine at a higher speed (e.g., 1000 RPM). The amount of fuel injected to the engine is based on engine temperature, barometric pressure, and the actual total number of fuel injections since the engine was last stopped. These variables are sensed and/or inferred in an effort to compute the cylinder air charge which is then matched with a corresponding fuel amount. The engine is stopped at time t10 and it has been stopped for more than a threshold amount of time (e.g., 25 minutes) so that pressure in the fuel system may act to release fuel from one or more fuel injectors when the fuel injectors are commanded off (e.g., no voltage is applied to the fuel injectors).

Shortly before time t11, the engine is cranked and then combustion within the engine accelerates the engine toward idle speed at time t11. The engine lambda value begins at a high level and it decreases quickly as exhaust gas exits engine cylinders. The engine lambda value decreases to a minimum value of about 0.9 and then it begins to slowly increase. The engine lambda value of 0.9, for example, corresponds to less than a threshold amount of fuel being released from fuel injectors during the engine stop period. The engine lambda value of 0.9 corresponds to an engine Φ (e.g., fuel-air ratio divided by the stoichiometric fuel-air ratio) value of 1.11 (e.g., maximum Φ of 1.11 during this sequence). A maximum engine Φ value less than a threshold value of 1.3, for example, during engine cranking and run-up may correspond to less than a threshold amount of fuel being released from the fuel injectors during the engine stop period. A maximum engine Φ value less than 1.3, for example, during engine cranking and run-up may correspond to less than a threshold amount of fuel being released from the fuel injectors during the engine stop period. The mixture exiting the engine is much less rich than the mixture exiting the engine shown in FIG. 2A due to the absence of fuel being released to engine cylinders while the engine was stopped. The concentration of hydrocarbons emitted from the engine is also significantly lower than the concentration of hydrocarbons shown in FIG. 2A.

Referring now to FIG. 3, plot showing prophetic engine starting sequences is shown. The sequence of FIG. 3 may be provided via the system of FIG. 1 in cooperation with the method of FIGS. 4 and 5. The plots of FIG. 3 are time aligned and they occur at the same time. Vertical lines at time t20-t27 represent times of interest in the sequence. Controller 12 may include non-transitory executable instructions to operate the engine at the conditions shown and discussed in the description of FIG. 3. The starting sequence of FIG. 3 is for a four cylinder four stroke engine having a firing order of 1-3-4-2.

The first plot from the top of FIG. 3 is a plot of engine speed versus time. The vertical axis represents engine speed and engine speed increases in the direction of the vertical axis arrow. The horizontal axis represents time and time increases from the right side of the figure to the left side of the figure. Line 302 represents engine speed.

The second plot from the top of FIG. 3 is a plot of oxygen sensor temperature versus time. The vertical axis represents oxygen sensor temperature and oxygen sensor temperature increases in the direction of the vertical axis arrow. The horizontal axis represents time and time increases from the right side of the figure to the left side of the figure. Line 304 represents the oxygen sensor temperature. Dashed line 303 represents a threshold oxygen sensor temperature. Pumping current of the oxygen sensor becomes proportional to the concentration of oxygen sensed via the oxygen sensor when oxygen sensor temperature is greater than threshold 303.

The third plot from the top of FIG. 3 is a plot of first cylinder to receive fuel after a most recent engine stop. The vertical axis represents the first cylinder to receive fuel after a most recent engine stop. For example, if the engine is stopped rotating and it is then cranked, the first cylinder to receive fuel by commanding on a fuel injector after the most recent engine stop is the first cylinder to receive fuel. The engine cylinder numbers are indicated along the vertical axis. The horizontal axis represents time and time increases from the right side of the figure to the left side of the figure. Line 306 represents first engine cylinder to receive fuel after a most recent engine stop.

The fourth plot from the top of FIG. 3 is a plot of an engine start request versus time. The vertical axis represents the engine start request and an engine start request is present when trace 308 is at a higher level near the vertical axis arrow. An engine start request is not present when trace 308 is near the horizontal axis. The engine start request remains at a high level even after the engine is started. The horizontal axis represents time and time increases from the right side of the figure to the left side of the figure. Line 308 represents the engine start request state.

The fifth plot from the top of FIG. 3 is a plot of engine λ as determined from oxygen sensor output versus time. The vertical axis represents engine λ and the engine λ values are located along the vertical axis. The horizontal axis represents time and time increases from the right side of the figure to the left side of the figure. Line 310 represents the engine λ. Dashed line 311 represents a stoichiometric air-fuel ratio.

The sixth plot from the top of FIG. 3 is a plot of engine fuel injector fuel release indication versus time. The vertical axis represents the engine fuel injector fuel release indication state and fuel injector fuel release is indicated to be present when trace 312 is at a higher level near the vertical axis arrow. Engine fuel injector fuel release is not indicated when trace 312 is near the horizontal axis.

The seventh plot from the top of FIG. 3 is a plot of showing which if any engine cylinder is deactivated during engine starting versus time. The vertical axis represents the engine cylinder that is deactivated and the engine cylinder numbers are listed along the vertical axis. No engine cylinders are deactivated when trace 314 is near the horizontal axis. A cylinder is deactivated via holding the cylinder's intake and exhaust valves closed and not injecting fuel to the cylinder. Alternatively the cylinder's intake valve may be held closed while the exhaust valve is permitted to operate without injecting fuel to the cylinder. The horizontal axis represents time and time increases from the right side of the figure to the left side of the figure. Line 314 represents the engine cylinder that is deactivated during engine starting.

At time T20, one or more fuel injectors have released fuel into one or more engine cylinders while the engine is stopped (not rotating) for more than a threshold amount of time while the fuel injectors are commanded off. The oxygen sensor temperature is low and cylinder number one is the first engine cylinder scheduled to fire (e.g., combust air and fuel) since the most recent engine stop. Cylinder number one is selected as the first engine cylinder to fire since the most recent engine stop based on the engine stopping position. In this example, the engine may be stopped at 340 crankshaft degrees before top-dead-center compression stroke for cylinder number one where the intake valve of cylinder number one is open. The engine start request is not asserted and the engine air-fuel is not providing an accurate value. The fuel injector fuel release indication is not asserted and no cylinders are scheduled to be deactivated during a subsequent engine start.

The heater of the oxygen sensor is not activated and power is not applied to the oxygen sensor at time t20. The oxygen sensor may operate by electrochemically pumping the oxygen sensed by the oxygens sensor out of an internal cavity when a voltage (e.g., pumping voltage) is applied across a pumping cell of the oxygen sensor (not shown). Applying the pumping voltage to the pumping cell pumps oxygen into or out of the internal cavity in order to maintain a stoichiometric level of oxygen therein. The resulting pumping current is proportional to the concentration of oxygen in the intake air or exhaust gas when the oxygen sensor is at operating temperature (e.g., above light off temperature). The pumping current may be converted to a voltage and output from the oxygen sensor. However, if the oxygen sensor temperature is not above light off temperature (e.g., a lower threshold temperature), then the oxygen sensor output may not be representative of the oxygen concentration sensed by the oxygen sensor. Because the output of an oxygen sensor (e.g., oxygen sensor 126 of FIG. 1) may vary significantly with temperature, accurate control of the oxygen sensor temperature may be desired. For example, the oxygen sensor may provide desired sensing above a lower threshold temperature. The lower threshold temperature may be a light-off temperature of the oxygen sensor, for example (e.g., between 720° C. and 830° C.). Therefore, the oxygen sensor temperature may be raised to the lower threshold temperature under conditions in which the oxygen sensor temperature is below the lower threshold temperature (e.g., at an engine cold start). For example, the oxygen sensor temperature may be raised to the lower threshold temperature via a heater during an oxygen sensor heat up period via a heater of the oxygen sensor. Because the output of the oxygen sensor may not be representative of the oxygen concentration sensed by the oxygen sensor, inferences of engine air-fuel ratio or fuel-air ratio may not be reliable at lower oxygen sensor temperatures. Therefore, engine starting may be delayed until the oxygen sensor is at or above the lower threshold (e.g., light off temperature). To reduce the engine starting delay, the oxygen sensor heater may be activated when the vehicle is unlocked or when the driver's door is opened. In addition, a significant amount of electrical power may be provided to the oxygen sensor heater in a short period of time so that oxygen sensor temperature reaches light off temperature in a short period of time. Further, electrified vehicles often don't start their engine right away, thus providing time for UEGO warm-up. For example, hybrid vehicles will often reverse out of the driveway and do not start the engine until a significant driver demand is requested. This also provides opportunity for electrically heated devices to heat-up. The system may also consider factors that lead to injector leak: pressure, time-at-pressure, and possibly, temperature. At the engine's first start, the time-at pressure may be days. However, during an engine restart, the time may be much shorter. Thus, if may be possible to detect that an injector is releasing fuel if it released fuel. However, release of fuel may not be conclusively determined if fuel released to a cylinder does not produce a rich exhaust gas spike repeatedly on restarts. If a fuel injector does not release fuel consistently during transient engine-stopped times, then the algorithm as described works well. Avoiding a false positive leaky cylinder assignment may require observing a the rich exhaust gas spike more than once.

At time t21, an engine start request is asserted and the oxygen sensor heater is activated in response to the engine start request, or alternatively, when the vehicle door is opened or when a key fob is proximate to the vehicle. Engine cranking is delayed until the oxygen sensor reaches the threshold temperature 303, then engine speed increases as the engine is started shortly after time t21. The engine λ value begins to decrease when the engine is started shortly after time t21. An injector fuel release is not indicated and no cylinders are deactivated.

Between time t21 and time t22, the engine λ is reduced to near 0.7, but a fuel release is not indicated in this example because it is desired to determine in which cylinder the fuel was released. However, in other examples, the injector fuel release may be indicated when the engine Φ value exceeds 1.3, for example. No engine cylinders are deactivated and the oxygen sensor temperature is greater than threshold 303. The first cylinder scheduled to fire remains at its previous value of one since the engine is operating and the final engine stopping position is unknown.

At time t22, the engine start request is withdrawn and the engine is stopped shortly thereafter. The oxygen sensor temperature is greater than threshold 303 and the engine $\lambda$ value increases to indicate that air is being sensed. The first cylinder to fire for the next engine start is updated shortly after time t22 when the engine stops. The first cylinder to fire value is revised to a value of four based on the engine stopping position and because fuel release by a fuel injector has been determined. A fuel injector fuel release is not indicated and the cylinder to be deactivated during the next engine start is updated shortly after the engine stops based on the first cylinder to fire during the last most recent engine start. The engine cylinder to be deactivated for the next engine start is updated shortly after time t22 and after the engine stops rotating. The deactivated cylinder for the next engine start is cylinder number one since it was the first cylinder to fire during the last most recent engine start.

At time t23, an engine start is requested based on a low state of battery charge. However, since the oxygen sensor temperature is less than threshold 303, the engine start is delayed until time t24. The engine start is delayed while the oxygen sensor temperature sensor is increased to above level 303. A lower power level is applied to the oxygen sensor heater at this time since rapid engine starting is not immediately necessary at this time. Consequently, it takes longer for the oxygen sensor to reach operating temperature, which causes the delay between time t23 and time t24. The time between time t22 and time t24 may be more than a threshold amount of time so that sufficient time is given for fuel injector fuel release to occur.

At time t24, the engine is started after the oxygen sensor temperature exceeds threshold 303. The engine is started with cylinder number one being deactivated (e.g., intake and exhaust valves held closed while the engine is cranked and during engine run-up) and the first engine cylinder to fire since the engine was last stopped is cylinder number four. The engine $\lambda$ value indicates air is being sensed by the oxygen sensor just before the engine is cranked, and then the $\lambda$ value starts to decrease. Fuel injector fuel release is not indicated.

Between time t24 and time t25, the engine $\lambda$ value decreases to a minimum value of about 0.92. This indicates that an amount of fuel released from the fuel injectors is not greater than a threshold amount of fuel. The fuel release indication is not asserted and deactivated cylinder number one is reactivated shortly after engine starting so that the engine may provide a greater amount of torque. Further, any fuel that may have been released into cylinder number one may be oxidized in the exhaust system and in the after treatment device. The oxygen sensor temperature remains above threshold 303 and engine speed varies with operating conditions. The first engine cylinder to fire since the most recent engine stop remains cylinder four.

At time t25, the engine start request is withdrawn and the engine is stopped shortly thereafter. The oxygen sensor temperature is greater than threshold 303 and the engine $\lambda$ value increases to indicate that air is being sensed. The first cylinder to fire for the next engine start is updated shortly after time t25 when the engine stops. The first cylinder to fire value is revised to a value of one so that release of fuel from the fuel injector of cylinder number one may be verified a second time. A fuel injector fuel release is not indicated and the cylinder to be deactivated during the next engine start is updated shortly after the engine stops. No cylinders are scheduled to be deactivated since the prior engine start indicated no fuel release and because fuel release from cylinder number one is going to be verified a second time before indicating fuel release from a fuel injector.

At time t26, an engine start is requested based on a low state of battery charge for a second time. However, since the oxygen sensor temperature is less than threshold 303, the engine start is delayed until time t27. The engine start is delayed while the oxygen sensor temperature sensor is increased to above level 303. A lower power level is applied to the oxygen sensor heater at this time since rapid engine starting is not immediately necessary at this time. Consequently, it takes longer for the oxygen sensor to reach operating temperature, which causes the delay between time t26 and time t27. The time between time t25 and time t27 may be more than a threshold amount of time so that sufficient time is given for fuel injector fuel release to occur.

At time t26, the engine is started after the oxygen sensor temperature exceeds threshold 303. The engine is started with all cylinders being activated and the first engine cylinder to fire since the engine was last stopped is cylinder number one so that confirmation of fuel release into cylinder number one may be verified or denied. The engine $\lambda$ value indicates air is being sensed by the oxygen sensor just before the engine is cranked, then the $\lambda$ value starts to decrease. Fuel injector fuel release is not indicated.

Shortly after time t27, the engine $\lambda$ decreases to a minimum value of about 0.7. This indicates that an amount of fuel released from the fuel injectors is greater than the threshold amount of fuel. The fuel release indication is now asserted since fuel release is not indicated when cylinder one was deactivated when the engine was started. In this way, cylinder number one may be isolated to determine that fuel has been released via a fuel injector of cylinder number one. Other engine cylinders may be isolated to verify or deny that fuel may have been released into those engine cylinders while the engine was stopped and fuel injectors were commanded off. An indication of fuel injector fuel release is generated shortly after the $\lambda$ value of 0.7 is observed during the engine start. The oxygen sensor temperature remains above threshold 303 and engine speed varies with operating conditions. The first engine cylinder to fire since the most recent engine stop is cylinder number one.

Referring now to FIG. 4, shows an example method 400 for diagnosing the presence or absence of fuel being released from a fuel injector while the fuel injector is commanded off Method 400 may diagnose the presence or absence of fuel being released from a fuel injector that is commanded off after the engine has stopped rotating for a predetermined amount of time. The predetermined amount of time allows fuel to be released from the fuel injector when the fuel injector is commanded off. Instructions for carrying out method 400, including operating the engine at conditions described herein, may be executed by a controller (e.g., controller 12 of FIG. 1) based on instructions stored in non-transitory memory of the controller and in conjunction with signals received from sensors of the engine system, such as the sensors described above with reference to FIG. 1 (e.g., UEGO sensor 126). The controller may employ engine actuators of the engine system to adjust engine operation according to the method described below.

At 402, method 400 judges if the engine is stopped. Method 400 may judge that the engine is stopped when the engine's position sensor indicates that the engine is not rotating. If method 400 judges that the engine is not stopped, method 400 proceeds to exit. If method 400 judges that the engine is stopped, method 400 proceeds to 404.

At 404, method 400 determines engine temperature. The controller may determine engine temperature via the engine temperature sensor. Method 400 proceeds to 406 after determining engine temperature.

At 406, method 400 determines the first cylinder scheduled to fire after the most recent engine stop. In one example, method 400 judges the first cylinder scheduled to fire based on the engine's stopping position. The engine stopping position may be determined when the engine stops or in response to an engine start request. In one example, method 400 selects the first cylinder scheduled to fire (e.g., combust air and fuel) as being the engine cylinder that has an open intake valve and having its piston closest to top dead center compression stroke. In other examples, method 400 may select the cylinder that has its piston closest to top dead center compression stroke. In still other example, method 400 may select the first cylinder to fire via other selection processes. Method selects the first cylinder to combust during a subsequent next engine start and then proceeds to 408.

At 408, method 400 judges if an engine start has been requested or if an engine start is scheduled. An engine start may be requested via a human driver or via an automated process (e.g., based on the vehicle's accelerator and brake pedal positions). An engine start may be scheduled via an autonomous driver or via the vehicle's control system in response to road conditions and vehicle conditions. An engine start may be scheduled at a time in the future from the present time (e.g., in 60 seconds). Method 400 may judge that an engine start has been requested or scheduled based on a value of a variable stored in memory. For example, an engine start request variable may transition from a value of zero to a value of one to indicate an engine start request. If method 400 judges that an engine start request is present or scheduled, method 400 proceeds to 412. Otherwise, method 400 returns to 404.

At 410, method 400 judges if engine temperature is greater than (G.T.) a threshold temperature. The threshold temperature may be an engine temperature where only a small amount of fuel enrichment is provided to the engine because of lower fuel volatility. In one example, the engine threshold temperature may be 20 degrees Celsius. If method 400 judges that engine temperature is greater than the threshold temperature, the answer is yes and method 400 proceeds to 412. Otherwise, the answer is no and method 400 permits the engine to start and proceeds to exit.

In addition, in some examples, method 400 may require that the engine is stopped for a predetermined amount of time to allow for release of fuel from the engine's fuel injectors (e.g., 25 minutes). The threshold amount of time may vary depending on pressure of fuel supplied to the fuel injectors and engine temperature. If method 400 judges that the engine has been stopped for the threshold amount of time, the answer is yes and method 400 proceeds to 412. Otherwise, the answer is no and method 400 permits the engine to start and proceeds to exit.

At 412, method 400 supplies electrical power to the vehicle's oxygen sensors. The power activates the oxygen sensor heater and provides a voltage to activate the sensor's sensing element. Method 400 proceeds to 414. The electrical power provided to the oxygen sensor may be sufficient to activate the oxygen sensor such that the oxygen sensor's pumping current is proportionate to the concentration of oxygen sensed via the oxygen sensor within a threshold amount of time (e.g., less than 1 second).

At 414, method 400 judges if the oxygen sensor's pumping current is proportionate to the concentration of oxygen sensed by the oxygen sensor. In one example, method 400 judges that the oxygen sensor's pumping current is proportionate to the concentration of oxygen sensed by the oxygen sensor if a predetermined amount of time has elapsed since electrical power was most recently supplied to the oxygen sensor after the oxygen sensor was previously deactivated. If method 400 judges that the oxygen sensor's pumping current is proportionate to the concentration of oxygen sensed via the oxygen sensor, the answer is yes and method 400 proceeds to 416. Otherwise, the answer is no and method 400 returns to 414.

At 416, method 400 begins to record engine fuel-air ratio $\phi$ to controller transitory memory. The engine fuel-air ratio $\phi$ may be determined as a function of the output voltage of the oxygen sensor. In particular, voltage output from the oxygen sensor references a transfer function that describes engine fuel-air ratio as a function of oxygen sensor voltage output. Method 400 proceeds to 418.

At 418, method 400 cranks the engine (e.g., rotates the engine using power of an electric machine such as a starter or motor/generator) and starts the engine via supplying fuel to the engine's cylinders and spark. Method 400 proceeds to 420.

At 420, method 400 determines an engine fuel-air ratio value $\phi$ that is greater than all other engine fuel-air ratios measured during the present engine cranking, run-up, and after the engine reaches idle speed for a threshold amount of time (e.g., a maximum engine $\phi$). Alternatively, method 400 may integrate the engine fuel-air ratio value $\phi$ for a predetermined amount of time from the time engine cranking begins to a threshold amount of time after the engine reaches engine idle speed (e.g., 800 RPM). Method 400 proceeds to 422 after determining the maximum engine fuel-air ratio value $\phi$ or the integrated engine fuel-air ratio value $\phi$.

At 422, method 400 judges if the maximum engine fuel-air ratio value $\phi$ is greater than a threshold value (e.g., 1.3) or if the integrated engine fuel-air ratio value $\phi$ is greater than a predetermined value. The predetermined values may be stored in controller memory. If method 400 judges that the maximum engine fuel-air ratio value $\phi$ is greater than a threshold or if the integrated engine fuel-air ratio value $\phi$ is greater than the predetermined value, the answer is yes and method 400 proceeds to 424. Otherwise, the answer is no and method 400 proceeds to 440.

At 424, method 400 judges whether or not to isolate the engine fuel injector that is believed to be releasing fuel to the engine. In one example, method 400 may judge to isolate the engine fuel injector when the engine includes actuators to deactivate individual engine cylinders. By isolating the engine's fuel injectors via deactivating engine cylinders, it may be possible to identify the fuel injector that may be releasing fuel to an engine cylinder. If method 400 judges to isolate the fuel injector, the answer is yes and method 400 proceeds to 426. Otherwise, the answer is no and method 400 proceeds to 450.

At 426, method 400 judges whether or not a cylinder was deactivated during the most recent engine start when the engine fuel-air ratio value $\phi$ was stored to memory. Method 400 may judge that an engine cylinder was deactivated during the most recent engine start based on a value of a variable stored in memory. For example, a variable may indicate that cylinder number one was active when the value of the variable is one. The variable may indicate that cylinder number was deactivated when the value of the variable is zero. If method 400 judges that a cylinder was deactivated during the most recent engine start, the answer is yes and method 400 proceeds to 460. Otherwise, the answer is no and method 400 proceeds to 428.

At 428, method 400 schedules a first cylinder that fired during the previous engine start to be deactivated during the next subsequent engine start. For example, if cylinder number one was the first cylinder to fire, then cylinder number one is deactivated during the next subsequent engine start. By deactivating the first cylinder that fired during a last most recent engine start, it may be possible to determine the fuel injector that is releasing fuel into the engine. Method 400 proceeds to 430.

At 430, method 400 may indicate that one or more fuel injectors may be releasing fuel to the engine when the fuel injector is commanded off. Alternatively, method 400 may not immediately indicate that one or more fuel injectors may be releasing fuel to the engine when method 400 is attempting to isolate the fuel injector that may be releasing fuel.

The indication may be provided via a human/machine interface, display light, or other indicating device. In addition, method 400 may adjust one or more actuators to compensate for the released fuel. For example, the amount of fuel injected via each of the engine's fuel injectors may be decreased by a small predetermined amount to decrease the engine's fuel-air ratio $\phi$ during the next subsequent engine start. Method 400 proceeds to exit.

At 440, method 400 judges if a cylinder was deactivated during the previous most recent engine start when the engine fuel-air ratio value $\phi$ was stored to memory. Method 400 may judge that an engine cylinder was deactivated during the most recent engine start based on a value of a variable stored in memory. For example, a variable may indicate that cylinder number one was active when the value of the variable is one. The variable may indicate that cylinder number was deactivated when the value of the variable is zero. If method 400 judges that a cylinder was deactivated during the most recent engine start, the answer is yes and method 400 proceeds to 442. Otherwise, the answer is no and method 400 proceeds to 446.

At 442, method 400 indicates that the fuel injector of the cylinder that was deactivated during the most recent engine start is releasing fuel to the engine even though the fuel injector is deactivated. Since the engine fuel-air ratio value $\Phi$ was not greater than the threshold value while the cylinder suspected of having fuel released to it via a fuel injector was deactivated after the engine fuel-air ratio value $\Phi$ was greater than the threshold value during an earlier engine start, it may be judged that the cylinder that was deactivated has a degraded fuel injector that releases fuel to the engine in an amount that is greater than a threshold amount when the fuel injector is commanded off. The closed intake and exhaust valves may act to prevent fuel that has been released to the cylinder from exiting the cylinder and from being discharged to the exhaust system.

For example, if cylinder number one was deactivated due to the engine fuel-air ratio value $\Phi$ being greater than a threshold and due to cylinder number one being the first cylinder to combust air and fuel after a most recent engine stop, then the engine was restarted with cylinder number one being deactivated and the engine fuel-air ratio value $\Phi$ was less than the threshold amount, it may be determined that the fuel injector of cylinder number one released fuel into cylinder number one when the fuel injector was commanded off. Therefore, the fuel injector of cylinder number one may be indicated as degraded via a human/machine interface, via a computer network, or via alternative communications systems.

In addition or alternatively, in some examples as shown in FIG. 3, the cylinder having the fuel injector that has been determined to be degraded may not be indicated immediately. Rather, the cylinder may be reactivated during a next subsequent engine start. If the engine fuel-air ratio value $\Phi$ exceeds the threshold value again during engine cranking, run-up, and idle of the next subsequent engine start, then the fuel injector of the cylinder determined to be degraded may be indicated to the vehicle's driver and other vehicle systems. Method 400 proceeds to 444.

At 444, method 400 may operate one or more actuators to compensate for fuel being released to a cylinder. In one example, the cylinder with the degraded fuel injector may be deactivated via holding exhaust valves and/or intake valves closed during engine starting (e.g., for more than one engine cycle) while other cylinders operate with their intake and exhaust valves opening and closing. The deactivated cylinder may be restarted after engine start and after catalyst temperature reaches a threshold temperature so that if a rich mixture exits the previously deactivated cylinder, then it may be oxidized in the exhaust manifold or in the catalyst. Spark may be inhibited in the cylinder with the deactivated valve also to conserve spark energy. Further, the degraded fuel injector may be deactivated during engine cranking, run-up, and at least until engine speed reaches engine idle speed. Method 400 proceeds to exit after adjusting engine actuators in response to a degraded fuel injector.

At, 446, method 400 clears an indication of one or more fuel injectors releasing fuel to an engine cylinder if no fuel is released from the fuel injectors for more than a predetermined actual total number of engine starts with all engine cylinders being activated. Thus, if the fuel injector is replaced and the new fuel injector does not release fuel to an engine cylinder, then the indication of a degraded fuel injector may be cleared from controller memory and the human/machine interface. Method 400 proceeds to exit.

At 450, method 400 indicates that one or more fuel injectors of the engine may be degraded. Since the engine may not have a capacity to isolate which fuel injector is releasing fuel while the fuel injector is commanded off, method 400 may simply indicate that one or more fuel injectors may be degraded in response to the fuel-air amount $\Phi$ being greater than the threshold value. Method 400 proceeds to 452.

At 452, method 400 may operate reduce the amount of fuel injected into each engine cylinder in response to the indication of fuel being released into the engine via a fuel injector that is commanded off. Further, if the vehicle is a hybrid vehicle, method 400 may prohibit automatic engine stopping (e.g., ceasing engine rotation responsive to driving conditions without a human driver explicitly requesting an engine stop) so that engine emissions may stay at lower level by not restarting in engine that has fuel released to a cylinder via a fuel injector that is commanded off. Thus, fuel injectors may be commanded on at times when they may otherwise be commanded off to conserve fuel. Further, spark and valves may be continuously operated even during conditions when they may otherwise be commanded off automatically via a controller. Method 400 proceeds to exit.

At 460, method 400 judges if four or more consecutive fuel injector fuel release indications are present after four or more consecutive engine starts. The number four may be different for different types of engines. For example, the number may be three for a six cylinder engine having two cylinder banks, each cylinder bank having three cylinders. If method 400 judges that more than a predetermined number of consecutive engine starts exhibit engine fuel-air ratio values Φ in excess of a threshold fuel amount, then the answer is yes and method 400 proceeds to 462. Otherwise, the answer is no and method 400 proceeds to 470.

At 462, method 400 indicates that one or more fuel injectors may be releasing fuel to engine cylinders when the fuel injectors are commanded off for more than a threshold amount of time. Since method 400 deactivates each cylinder of a cylinder bank before judging if more than four consecutive fuel release indications are present, it may be judged that two or more fuel injectors may be releasing fuel to engine cylinders while the fuel injectors are commanded off. For example, if all engine cylinders are releasing more than a threshold amount of fuel to engine cylinders, the engine fuel-air ratio value Φ may be greater than the threshold value each time the engine is restarted. In some examples, method 400 may check all engine cylinders for fuel injectors releasing fuel to engine cylinders when they are commanded off by deactivating each engine cylinder during an engine start (e.g., only one cylinder deactivated each engine start) until each cylinder of a cylinder bank has been deactivated. If the engine fuel-air ratio value Φ is less than the threshold value when a particular cylinder is deactivated, it may be judged that that particular cylinder may have a fuel injector that is releasing fuel when the fuel injector is commanded off. On the other hand, if the engine fuel-air ratio value Φ is greater than the threshold value when each cylinder is deactivated (e.g. deactivated separately over four different engine starts), then method 400 may judge that two or more cylinder may have fuel injectors that are releasing fuel when the fuel injectors are commanded off. In this way, method 400 may judge which cylinders may have a fuel injector that may be releasing fuel to a cylinder. Method 400 proceeds to 464.

At 464, method 400 may operate reduce the amount of fuel injected into each engine cylinder in response to the indication of fuel being released into the engine via a fuel injector that is commanded off. Further, if the vehicle is a hybrid vehicle, method 400 may prohibit automatic engine stopping (e.g., ceasing engine rotation responsive to driving conditions without a human driver explicitly requesting an engine stop) so that engine emissions may stay at lower level by not restarting in engine that has fuel released to a cylinder via a fuel injector that is commanded off. Thus, fuel injectors may be commanded on at times when they may otherwise be commanded off to conserve fuel. Further, spark and valves may be continuously operated even during conditions when they may otherwise be commanded off automatically via a controller. Method 400 proceeds to exit.

At, 470, method 400 schedules the next cylinder in the engine's firing order on the same cylinder bank for deactivation during the next engine start. For example, if the engine is a four cylinder engine with a firing order of 1-3-4-2 and cylinder number one was deactivated during the most recent engine start, then method 400 may schedule cylinder number three to be deactivated during the next engine start. In this way, method 400 may selectively deactivate engine cylinders until the engine fuel-air ratio value Φ is less than the threshold value during an engine start to determine which fuel injector may be releasing fuel to an engine cylinder when the fuel injector is commanded off. Method 400 proceeds to exit.

The technical effect of determining the presence or absence of fuel being released to an engine cylinder may reduce engine emissions. Further, by selectively deactivating engine cylinders during engine starting, a cylinder having a fuel injector that is releasing fuel to an engine cylinder while being commanded off may be determined so that service persons may quickly locate the degraded fuel injector.

Thus, the method of FIGS. 4 and 5 provides for an engine operating method, comprising: identifying a fuel injector of an engine that releases fuel while the fuel injector is commanded off via a controller and a fuel-air ratio indicated from an oxygen sensor during engine cranking and run-up; and adjusting an actuator via the controller based on the fuel injector. The method includes where the actuator is a cylinder poppet valve operator. The method includes where the actuator is the fuel injector. The method includes where the engine is not rotating when the fuel is released to the engine cylinder. The method further comprises: identifying a first cylinder to fire during the engine cranking and run-up and selectively deactivating engine cylinders in response to an indication of more than a threshold amount of fuel being released from the fuel injector.

In some examples, the method further comprises: selectively deactivating cylinders of the engine to identify the fuel injector during subsequent engine starts after the engine cranking and run-up. The method further comprises: activating a heater of the oxygen sensor and heating the oxygen sensor to a temperature where pumping current of the oxygen sensor is proportionate with an oxygen concentration sensed via the oxygen sensor before applying the fuel-air ratio indicated by the oxygen sensor to identify the fuel injector. The method further comprises: delaying engine starting until the oxygen sensor is heated to the temperature where pumping current of the oxygen sensor is proportionate with the oxygen concentration sensed via the oxygen sensor.

The method of FIGS. 4 and 5 also provides for an engine method, comprising: positively identifying that one or more fuel injectors of an engine have released greater than a threshold amount of fuel to the engine while the engine was stopped and while engine fuel injectors were commanded off, the positive identification determined via a controller evaluating an engine fuel-air ratio estimate produced during engine cranking and run-up, the engine fuel-air ratio produced via an oxygen sensor having a temperature greater than or equal to a temperature where a pumping current of the oxygen sensor is proportionate to a concentration of oxygen sensed via the oxygen sensor; and adjusting an actuator via the controller in response to the positive identification. The method further comprises negatively identifying that the one or more fuel injectors have released greater than the threshold amount of fuel to the engine while the engine was stopped and while engine fuel injectors were commanded off, the negative identification determined via the controller evaluating the engine fuel-air ratio estimate produced during engine cranking and run-up being greater than a threshold. The method includes where the positively identification is based on the engine fuel-air ratio being greater than a threshold during the engine cranking or run-up.

In some examples, the method further comprises: numerically integrating (e.g., via the trapezoidal method of integration) the fuel-air ratio estimate produced during engine cranking and run-up. The method includes where the positively identification is based on the integrated engine fuel-air ratio being greater than a threshold. The method further comprising: identifying a cylinder in which the one or more fuel injectors released greater than the threshold amount of fuel. The method further comprises: not identifying that the one or more fuel injectors of the engine have released greater than the threshold amount of fuel when a temperature of the engine is less than a threshold. Further, the methods described herein may be repeatedly executed during the course of operation.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
identifying a fuel injector of an engine that releases fuel while the fuel injector is commanded off via a controller and a fuel-air ratio indicated from an oxygen sensor during engine cranking and run-up; and
adjusting an actuator via the controller based on the fuel injector.

2. The method of claim 1, where the actuator is a cylinder poppet valve operator.

3. The method of claim 1, where the actuator is the fuel injector.

4. The method of claim 1, where the engine is not rotating when the fuel injector releases fuel to the engine.

5. The method of claim 1, further comprising:
identifying a first cylinder to fire during the engine cranking and run-up and selectively deactivating engine cylinders in response to an indication of more than a threshold amount of fuel being released from the fuel injector.

6. The method of claim 5, further comprising:
selectively deactivating cylinders of the engine to identify the fuel injector during subsequent engine starts after the engine cranking and run-up.

7. The method of claim 1, further comprising:
activating a heater of the oxygen sensor and heating the oxygen sensor to a temperature where pumping current of the oxygen sensor is proportionate with an oxygen concentration sensed via the oxygen sensor before applying the fuel-air ratio indicated by the oxygen sensor to identify the fuel injector.

8. The method of claim 7, further comprising:
delaying engine starting until the oxygen sensor is heated to the temperature where pumping current of the oxygen sensor is proportionate with the oxygen concentration sensed via the oxygen sensor.

* * * * *